UNITED STATES PATENT OFFICE.

UTLEY WEDGE, OF ARDMORE, PENNSYLVANIA.

PREPARING IRON OXID FOR USE IN BLAST-FURNACES.

No. 804,693.

Specification of Letters Patent.

Patented Nov. 14, 1905.

Application filed November 4, 1904. Renewed August 23, 1905. Serial No. 275,510.

*To all whom it may concern:*

Be it known that I, UTLEY WEDGE, a citizen of the United States, and a resident of Ardmore, Pennsylvania, have invented certain Improvements in Preparing Iron Oxid for Use in Blast-Furnaces, of which the following is a specification.

The object of my invention is to prepare for use in a blast-furnace relatively fine particles of oxid of iron, such as the red hematite ores, and the cinder resulting from the desulfurization of iron pyrites in the manufacture of sulfuric acid. These relatively fine particles of oxid of iron are not available for use in the blast-furnace, first, because of their tendency to pack and render the furnace charge too dense for the passage of the blast therethrough, and, secondly, because when a high-pressure blast is used they are liable to be carried off thereby and deposited in the flues of the furnace. I have found that such finely-divided oxids can be rendered available for blast-furnace use by combination with Portland cement, (or its principal constituents when properly pulverized,) the cement being mixed with the finely-divided iron oxid and the mixture then subjected to a proper degree of heat.

Portland cement is usually made from marl and clay, or chalk and clay, or argillaceous limestone by grinding the crude materials, mixing the same, calcining them to a clinker, and grinding the latter. Its usual composition is as follows: silica, about twenty-two per cent.; alumina, about eight per cent.; iron oxid, about three per cent.; magnesia, about two per cent.; lime, about sixty-two per cent.; sulfuric acid, about 1.75 per cent. The various elements are often considerably varied; but in all cases the mixtures are regulated or the crude material is selected with reference to its clinkering or attaining the point of incipient fusion at about a temperature of twenty-four hundred (2,400°) degrees Fahrenheit. As this temperature is just below the fusing-point of iron oxid, I have found that the material is especially adapted for effecting the agglomeration of the iron oxid into lumps or nodules, and such result can therefore be economically and practically secured in this way. The mixture should contain about three (3) per cent. of the cement and should preferably be subjected to agitation during the time it is being heated, the most convenient method of accomplishing such agitation being to feed the mixture through a rotating kiln of suitable length whose axis is slightly inclined in respect to the horizontal, the kiln being heated externally or internally or both.

Instead of using cement I may with good effect use the flue-dust which accumulates in cement-burning furnaces, such flue-dust being about two (2) per cent. higher in silica than the cement itself and being somewhat more readily fusible and besides not possessing as high a commercial value as the cement itself. Obviously also the use of the crude material from which cement is made will give the same results as the use of the finished cement, since the fusing-point of the material is substantially the same both before and after calcination. Similar results can also be secured by a mixture having substantially the same constituents as the cement or cement material—for instance, by a mixture of pure limestone with silicious clay in about the proportions in which these substances occur in cement. Hence in the term "cement" as used in the claims I include such cement materials either before or after calcination.

It should be understood that in carrying out my invention I do not rely upon the cement qualities of the material, but take advantage of the fact that it has a fusing-point close to that of the iron oxid. Hence material of chemical constitution and fusing qualities substantially the same as cement may be employed in carrying out my invention even if its cement qualities are poor or lacking, my invention aiming to utilize an entirely-different function from that for which cement is commercially employed.

Having thus described my invention, I claim and desire to secure by Letters Patent—

1. The mode herein described of preparing relatively fine particles of iron oxid for use in a blast-furnace, said mode consisting in mixing said particles with Portland cement and subjecting the mixture to such a degree of heat as will effect fusion of said cement, substantially as specified.

2. The mode herein described of preparing relatively fine particles of iron oxid for use in a blast-furnace, said mode consisting of mixing said particles with Portland cement, and then subjecting the mixture simultaneously to agitation and to such a degree of heat as will effect fusion of the cement, substantially as specified.

3. The mode herein described of preparing relatively fine particles of iron oxid for use in a blast-furnace, said mode consisting in mixing said particles with flue-dust of Portlandcement-burning furnaces, and subjecting the mixture to such a degree of heat as will effect fusion of said flue-dust, substantially as specified.

4. The mode herein described of preparing relatively fine particles of iron oxid for use in a blast-furnace, said mode consisting of mixing said particles with flue-dust of Portland-cement-burning furnaces, and then subjecting the mixture simultaneously to agitation and to such a degree of heat as will effect fusion of the flue-dust, substantially as specified.

In testimony whereof I have signed my name to this specification in the presence of two subscribing witnesses.

UTLEY WEDGE.

Witnesses:
MAMIE O'DONNELL,
CHARLES P. MILLER.